(12) United States Patent
Asanuma

(10) Patent No.: US 10,386,472 B2
(45) Date of Patent: Aug. 20, 2019

(54) RADAR DEVICE SIGNAL PROCESSING DEVICE AND SIGNAL PROCESSING METHOD FOR RADAR DEVICE

(71) Applicant: FUJITSU TEN LIMITED, Kobe-shi, Hyogo (JP)

(72) Inventor: Hisateru Asanuma, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 380 days.

(21) Appl. No.: 15/271,936

(22) Filed: Sep. 21, 2016

(65) Prior Publication Data
US 2017/0123059 A1   May 4, 2017

(30) Foreign Application Priority Data
Nov. 2, 2015   (JP) ................. 2015-216184

(51) Int. Cl.
| | | |
|---|---|---|
| G01S 13/58 | (2006.01) | |
| G01S 7/35 | (2006.01) | |
| G01S 13/34 | (2006.01) | |

(52) U.S. Cl.
CPC .......... *G01S 13/584* (2013.01); *G01S 7/352* (2013.01); *G01S 7/354* (2013.01); *G01S 13/343* (2013.01); *G01S 2007/356* (2013.01)

(58) Field of Classification Search
None
See application file for complete search history.

(56) References Cited

U.S. PATENT DOCUMENTS

| | | | |
|---|---|---|---|
| 2011/0074620 A1 | 3/2011 | Wintermantel | |
| 2011/0074621 A1 | 3/2011 | Wintermantel | |
| 2011/0080313 A1 | 4/2011 | Wintermantel et al. | |
| 2011/0080314 A1 | 4/2011 | Wintermantel | |
| 2015/0226848 A1* | 8/2015 | Park ...................... | G01S 13/584 342/70 |
| 2016/0124086 A1* | 5/2016 | Jansen .................. | G01S 13/582 342/93 |
| 2016/0146933 A1* | 5/2016 | Rao ........................ | G01S 7/023 342/132 |
| 2016/0327633 A1* | 11/2016 | Kumar Y.B. ........... | H01Q 23/00 |

FOREIGN PATENT DOCUMENTS

| | | |
|---|---|---|
| JP | 2004-085452 A | 3/2004 |
| JP | 2010-038705 A | 2/2010 |
| JP | 2011-526370 A | 10/2011 |
| JP | 2016-003873 A | 1/2016 |

\* cited by examiner

*Primary Examiner* — Vladimir Magloire
*Assistant Examiner* — Donald H B Braswell
(74) *Attorney, Agent, or Firm* — Oliff PLC

(57) ABSTRACT

There is provided a radar device. A transmitting unit transmits a first transmission signal generated based on a first parameter for computing a relative velocity or a distance in a first detection range, and a second transmission signal generated based on a second parameter for computing a relative velocity or a distance in a second detection range narrower than the first detection range. A receiving unit receives first and second reception signals from a target. A measuring unit computes a first relative velocity or a first distance in the first detection range based on the first reception signals, and compute a second relative velocity or a second distance in the second detection range based on the second reception signals, and selects any one of the first and second relative velocities, or any one of the first and second distances, as the result of measurement.

5 Claims, 13 Drawing Sheets

RADAR DEVICE SIGNAL PROCESSING DEVICE AND SIGNAL PROCESSING METHOD FOR RADAR DEVICE

TECHNICAL FIELD

The present invention relates to a technology related to a radar device, a signal processing device, and a signal processing method for performing target detection.

RELATED ART

Recently, as radar devices for detecting targets, FCM (fast chirp modulation) type radar devices have been proposed. An FCM system is a system for obtaining the distance between a target and a radar device on the basis of the frequencies of beat signals generated from a transmission signal and reception signals which are the reflected waves of the transmission signal from the target, and obtaining the relative velocity between the target and the radar device on the basis of phase change of the beat signals, and can separately obtain the distance and the relative velocity. Therefore, it is possible to expect more accurate target detection. Also, the FCM system has the advantage that, even in a case where targets having different relative velocities exist at the same distance, it is possible to discriminate the individual targets on the basis of their relative velocities, and it is possible to suppress angle errors from increasing due to the influence of the surroundings.

Patent Document 1 discloses an FCM type radar system configured to radiate a transmission signal by one or more transmitting antennae, and receive the reflected waves of the transmission signal from targets, by one or more receiving antennae. This system acquires reception signals by different combinations of the transmitting antennae and the receiving antennae, and obtains the bearings of the targets on the basis of the reception signals.

Patent Document 2 discloses a radar device configured to detect targets using a plurality of beat signals obtained from reception signals received in individual transmission-wave transmission periods by repeatedly outputting a transmission wave. The transmission wave has two or more periods each having a section in which the oscillation frequency monotonically increases and including at least two periods different in the inclination of change of the frequency.

Patent Document 3 discloses a radar device configured to perform a process of detecting the relative distance or relative velocity of each target object on the basis of beat signals generated in any one transmission period, and a process of detecting the relative distance or relative velocity of the corresponding target object on the basis of beat signals generated in another transmission period, and setting evaluation points for the detected relative distances or the detected relative velocities, and determines any one of the relative distances or any one of the relative velocities on the basis of the evaluation points, in each detection cycle including a plurality of transmission periods different in the rate of change of the frequency of a transmission signal.

Patent Document 1: Japanese Patent Application Publication No. 2011-526370A
Patent Document 2: Japanese Patent Application Publication No. 2014-085452A
Patent Document 3: Japanese Patent Application Publication No. 2010-038705A Here, a method of computing distance and relative velocity in the FCM system will be described in brief.

When the waveform of one period of a transmission wave in which the frequency varies like a saw-tooth wave is defined as one chirp, the FCM system transmits a plurality of chirps with a period shorter than that in the FMCW system, and receives reflected waves from a target, as reception signals, and obtains the differences between each of the reception signals and the transmission wave, thereby obtaining beat signals, and performs two-dimensional FFT (Fast Fourier Transform) on the beat signals, thereby obtaining the distance and relative velocity between the target and the radar device. Specifically, since the time delays of the reception signals relative to the transmission wave increase as the distance of the target increases, the frequencies of the beat signals are proportional to the distance. Therefore, if an FFT process is performed on each beat signal, a peak appears at the position of a frequency corresponding to the distance of the target. Also, since FFT can extract a reception level and phase information at each of frequency points (hereinafter, also referred to as range bins) set at intervals of a predetermined frequency, accurately, a peak appears at a frequency range bin corresponding to the distance of the target. Therefore, it is possible to obtain the distance to the target by detecting the peak frequency.

Now, relative velocity computation will be described. In a case where there is a relative velocity between the vehicle and the target, the FCM system detects a Doppler frequency between the beat signals, using phase change attributable to the Doppler frequency, thereby computing the relative velocity. In other words, if the relative velocity is 0, since there is no Doppler component between the reception signals, all of the phases of the reception signals related to the individual chirps become same. Meanwhile, in a case where there is a relative velocity between the vehicle and the target, a phase change is caused by a Doppler frequency between the reception signals related to the individual chirps. Since peak information obtained by performing FFT on the beat signals includes such phase information, if the peak information of the same target obtained from the individual beat signals is arranged in time series, and the second FFT is performed, the Doppler frequency is obtained from the phase information, and a peak appears at the position of the obtained frequency. This peak frequency corresponds to the relative velocity. As described above, it is possible to compute the distance and the relative velocity by performing FFT on the beat signals and performing FFT on the FFT results, that is, by performing two-dimensional FFT on the beat signals.

As described above, the FCM system consecutively transmits the plurality of chirps, and consecutively receives the plurality of reception signals corresponding to the chirps, and obtains a Doppler frequency from phase change between the consecutive reception signals, thereby performing velocity measurement. Therefore, the detection velocity range is determined on the basis of the period of the reception signals, that is, the period of the chirps, and if the relative velocity of the target exceeds the detection velocity range, velocity aliasing occurs, and thus it is impossible to correctly perform velocity measurement. The reason is that, since Doppler frequencies are sampled at the period of the chirps, if one period of the Doppler frequencies becomes less than twice the period of the chirps, Doppler frequencies are not correctly sampled, and are detected as aliasing signals (aliasing).

Also, with respect to the distances of targets, if the distance of a target gets out of a detection range, aliasing occurs, and thus accurate distance measurement is impossible. The reason is that, if a frequency corresponding to the distance of a target exceeds half of a sampling frequency for sampling on beat signals, the frequency corresponding to the distance is not correctly sampled, and is detected as an aliasing signal (aliasing).

For this reason, in order to set a wide distance or velocity detection range, it is required to perform sampling at a high sampling frequency. Therefore, even though it is desired to set a wide distance or velocity detection range, due to restrictions on hardware, there is a limit in increasing the sampling frequency for setting the wide detection range. Especially, since the FCM system uses a transmission signal (chirps) with a shorter period as compared to an FMCW (Frequency Modulated Continuous Wave) system of the related art, hardware having a high sampling frequency is necessary, and there is little room to increase the sampling frequency. Also, if the bandwidth of the transmission signal is set to be narrow, that is, ΔF is set to be low, without changing the sampling frequency, and the period of the transmission signal is set to be short, and a distance/elative-velocity detection ranges are set to be wide, an amount of data which can be acquired at the corresponding sampling frequency becomes relatively small, and the distance/relative-velocity resolution significantly decreases. Therefore, it becomes impossible to satisfy required performance.

In terms of conditions such as size, weight, and cost, at present, there is no hardware which is usable as an in-vehicle radar and has specifications capable of implementing a detection velocity range and a resolution equivalent to those of the FM-CW system of the related art, and thus it is difficult in the FCM system to implement a detection velocity range and a resolution equivalent to those of the FM-CW system.

Therefore, there is a problem that it is impossible to widely set a detection range and it is impossible to accurately perform measurement due to occurrence of aliasing in distance or relative velocity.

SUMMARY

It is therefore an object of the present invention to provide a technology related to a radar device and making it possible to obtain measurement results having as high accuracy as possible, according to the state of aliasing.

According to a first aspect of the embodiments of the present invention, there is provided a radar device comprising: a transmitting unit configured to transmit, at least, a first transmission signal generated on the basis of a first parameter for computing a relative velocity or a distance in a first detection range, and a second transmission signal generated on the basis of a second parameter for computing a relative velocity or a distance in a second detection range narrower than the first detection range; a receiving unit configured to receive the reflected waves of the first transmission signal from a target, as first reception signals, and receive the reflected waves of the second transmission signal from the target, as second reception signals; and a measuring unit configured to compute a first relative velocity or a first distance in the first detection range on the basis of the first reception signals, and compute a second relative velocity or a second distance in the second detection range on the basis of the second reception signals, and selects any one of the first relative velocity and the second relative velocity, or any one of the first distance and the second distance, as the result of measurement of the relative velocity or distance of the target.

According to a second aspect of the embodiments of the present invention, there is provided a signal processing device for a radar device, configured to: transmit, at least, a first transmission signal generated on the basis of a first parameter for computing a relative velocity or a distance in a first detection range, and a second transmission signal generated on the basis of a second parameter for computing a relative velocity or a distance in a second detection range narrower than the first detection range, and receive the reflected waves of the first transmission signal from a target, and the reflected waves of the second transmission signal from the target, as first reception signals and second reception signals, respectively; compute a first relative velocity or a first distance in the first detection range on the basis of the first reception signals; compute a second relative velocity or a second distance in the second detection range on the basis of the second reception signals; and select any one of the first relative velocity and the second relative velocity, or any one of the first distance and the second distance, as the result of measurement of the relative velocity or distance of the target.

According to a third aspect of the embodiments of the present invention, there is provided a signal processing method for a radar device, comprising: transmitting, at least, a first transmission signal generated on the basis of a first parameter for computing a relative velocity or a distance in a first detection range, and a second transmission signal generated on the basis of a second parameter for computing a relative velocity or a distance in a second detection range narrower than the first detection range, and receiving the reflected waves of the first transmission signal from a target, and the reflected waves of the second transmission signal from the target, as first reception signals and second reception signals, respectively; computing a first relative velocity or a first distance in the first detection range on the basis of the first reception signals; computing a second relative velocity or a second distance in the second detection range on the basis of the second reception signals; and selecting any one of the first relative velocity and the second relative velocity, or any one of the first distance and the second distance, as the result of measurement of the relative velocity or distance of the target.

Also, the present invention may be a program for implementing the processes which are performed in the above described signal processing device. Further, the present invention may be a computer-readable recording medium retaining that program. In this case, it is possible to make a computer or the like read and execute the program of the recording medium, thereby providing the functions of the program. Here, the term "computer-readable recording medium" means a recording medium in which information such as data and programs can be accumulated electrically, magnetically, optically, mechanically, or chemically, and from which the information can be read by a computer or the like.

According to the present invention, it is possible to provide a technology related to a radar device and making it possible to obtain measurement results having as high accuracy as possible, according to the state of aliasing.

BRIEF DESCRIPTION OF THE DRAWINGS

Exemplary embodiments of the present invention will be described in detailed based on the following figures, wherein.

DETAILED DESCRIPTION

Figure 1:
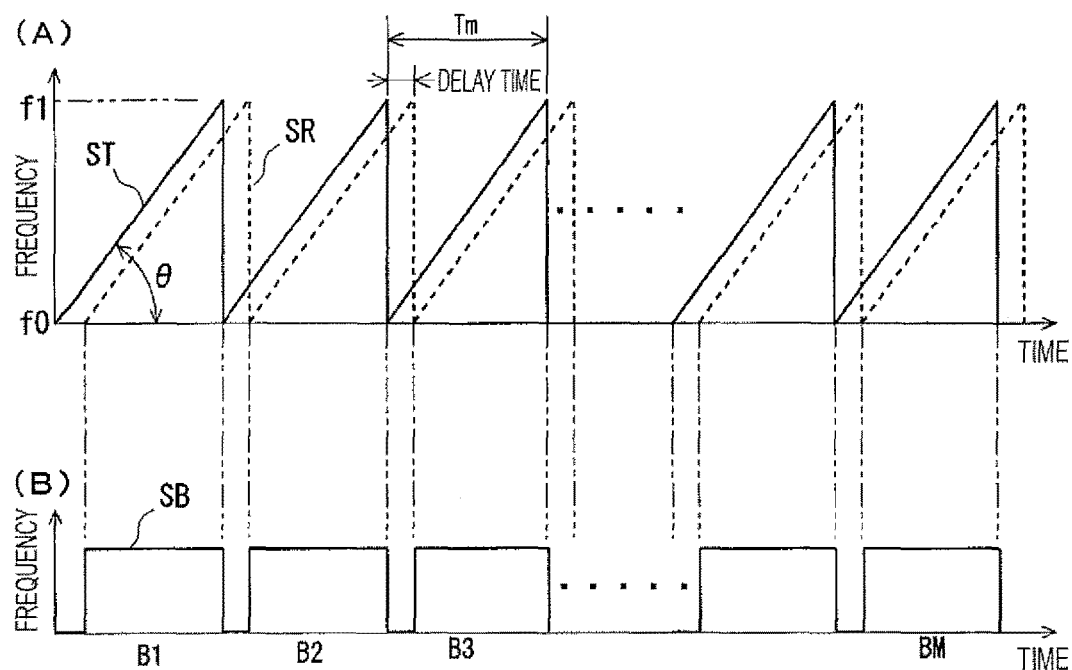
FIG. 1 is an explanatory view of an FCM system.
Figure 1:
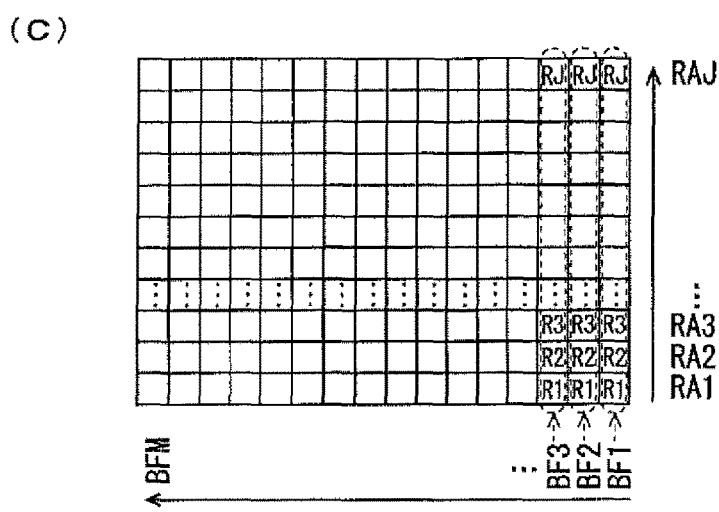
Figure 2:
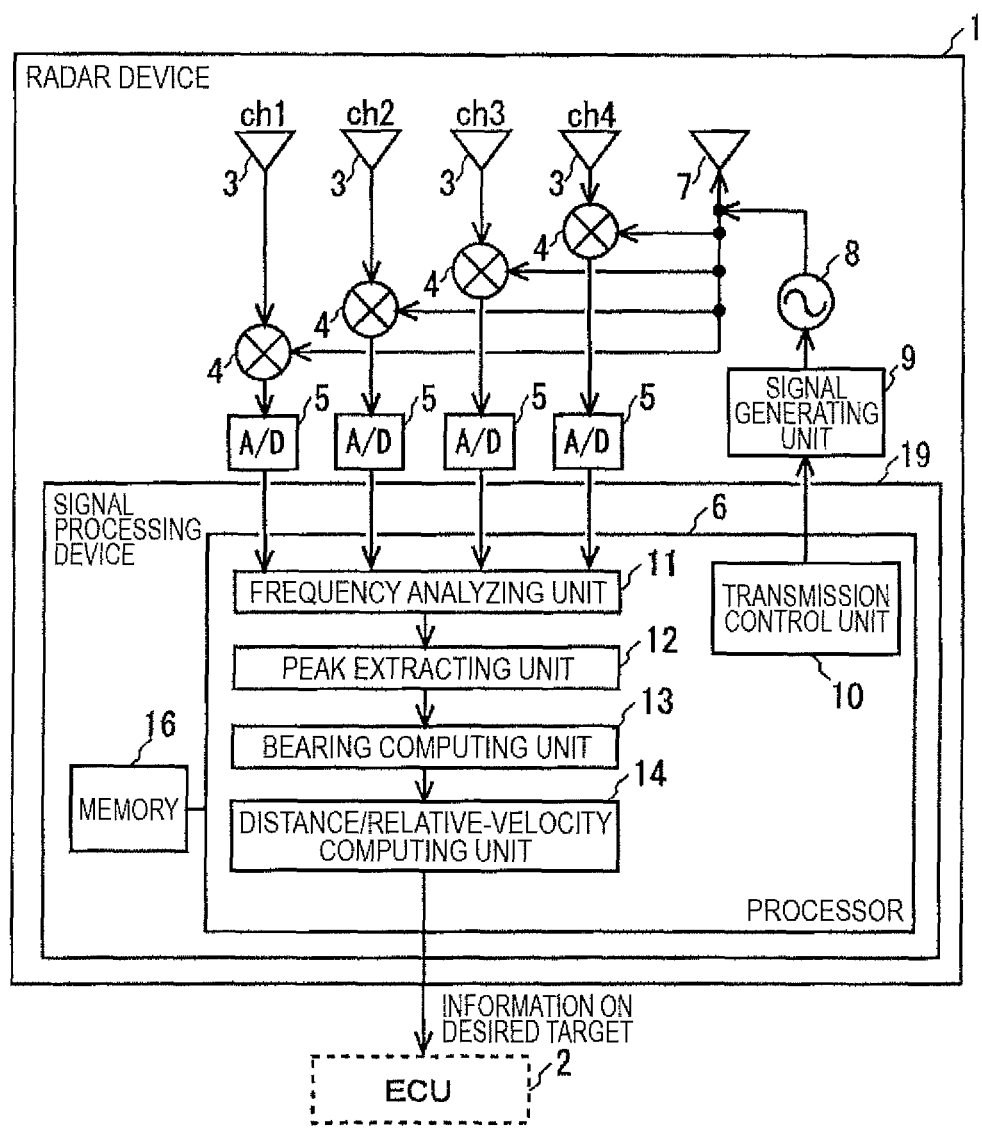
FIG. 2 is a configuration diagram of a radar device.

Hereinafter, an embodiment of a radar device of the present invention will be described on the basis of the accompanying drawings. FIG. 1 is an explanatory view of an FCM system, and FIG. 2 is a configuration diagram of a radar device 1 according to the embodiment. The radar device 1 according to the embodiments can be mounted on a vehicle and be used to detect targets existing around the vehicle, such as other vehicles, signs, and guard rails. The result of target detection can be output to some components of the vehicle, such as a storage unit and an electrical control unit (ECU), and be used in, for example, a pre-crash safety system (PCS) or an AEB (Advanced Emergency Braking) system to control the vehicle. However, the radar device 1 according to the embodiments may be used for various uses (such as monitoring of flying aircrafts and sailing vessels) other than an in-vehicle radar device.

(Configuration of Device)

The radar device 1 includes a transmitting antenna 7, an oscillator 8, and a signal generating unit 9. Also, the radar device 1 includes receiving antennae 3 (ch1 to ch4) arranged at regular intervals, mixers 4 (ch1 to ch4) connected to the receiving antennae 3, respectively, A/D (Analog to Digital) converters 5 (ch1 to ch4) connected to the mixers 4, respectively, and a signal processing device 19 configured to process data of the A/D converters 5.

Alternatively, the radar device 1 may include a receiving circuit dedicated for each receiving antenna, or may be include a receiving circuit configured to collectively receive reception signals of all receiving antennae. In this case, control for performing switching on the receiving antennae is required such that the receiving antennae sequentially correspond to the receiving circuit in a time division manner; however, it is possible to make the circuit configuration of the radar device 1 compact. In the present embodiment, a receiving antenna 3, a mixers 4, and an A/D converter 5 constitute one form of a receiving unit. In FIG. 2, an example having four receiving units is shown. However, the number of receiving units is not limited thereto, and may be arbitrarily set according to required performance and the like.

The radar device 1 of the present embodiment uses an FCM (Fast Chirp Modulation) system, and a method of computing distance and relative velocity in the FCM system will be first described in brief. The radar device 1 generates a transmission signal (chirps) ST in which the frequency varies like a saw-tooth wave as shown in (A) of FIG. 1 by the signal generating unit 9, and modulates the transmission signal by the oscillator 8, and transmits the transmission signal through the transmitting antenna 7. In FIG. 1, a symbol "Tm" is the period of the transmission signal ST which is generated by the signal generating unit 9. Also, one chirp (the waveform of one period) of the transmission signal ST has a saw-tooth shape in which the frequency increases with an inclination θ from a reference frequency f0 with time, and almost vertically returns to the reference frequency f0 if reaching a maximum value f1. However, the transmission signal ST may be generated such that the waveform of each period has a reverse saw-tooth shape in which the frequency almost vertically increases to the maximum value f1, and then decreases to the reference frequency f0 with the inclination θ with time ((C) of FIG. 5). The radar device 1 consecutively transmits a plurality of chirps determined on the basis of a desired detection velocity range and a desired velocity resolution, that is, requirement specifications for radar performance, and transmits a predetermined number of chirps for one scan.

Figure 3:
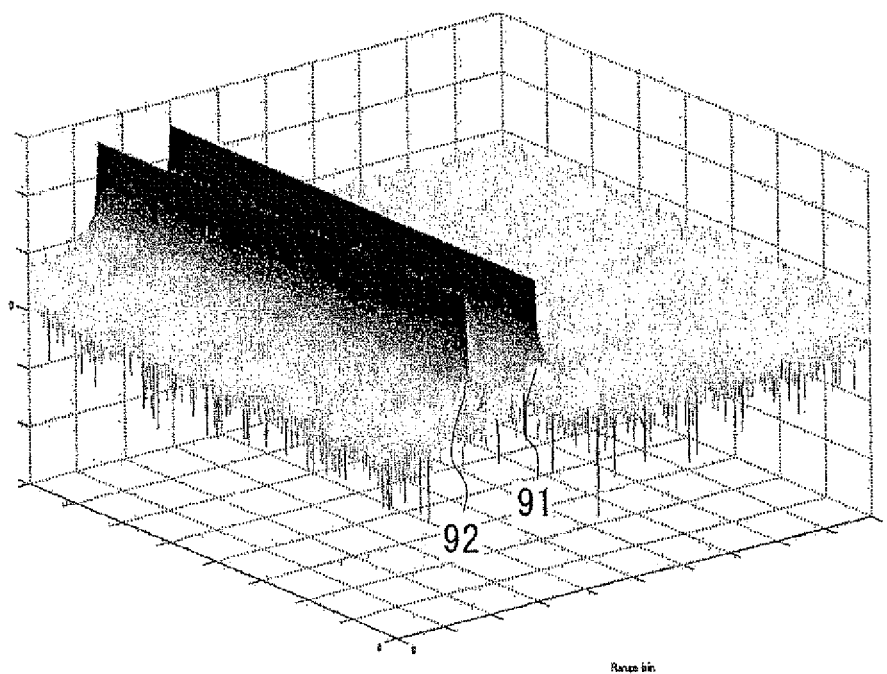
FIG. 3 is a view illustrating a result of a Fourier transform process of a range bin direction.

Thereafter, the radar device 1 receives reflected waves from a target, as reception signals SR, through the receiving antennae 3. The mixers 4 (ch1 to ch4) mix the reception signals SR with portions of the transmission signal ST, and computes the absolute values of the differences between the transmission signal ST and the reception signals SR, thereby generating beat signals SB as shown in (B) of FIG. 1. The beat signals SB are generated for each period Tm of the transmission signal shown in (A) of FIG. 1. In this case, since the time (delay time) from when the transmission signal ST shown in (A) of FIG. 1 is transmitted to when the reflected wave of the transmission signal from the target is received as a reception signal SR varies in proportion to the distance between the target and the radar device, the frequency of each beat signal SB (for example, B1) is proportional to the distance. Therefore, if an FFT (Fast Fourier Transform) is performed is performed on each beat signal SB, a peak appears at the position of a frequency corresponding to the distances of the target. Also, since an FFT can extract a reception level and phase information at each of frequency points (hereinafter, also referred to as range bins) set at intervals of a predetermined frequency, accurately, a peak appears at the range bin of a frequency corresponding to the distance of the target. Therefore, it is possible to obtain the distance to the target by detecting the peak frequency. FIG. 3 shows an example obtained by arranging the results of such an FFT process in a range bin direction in a matrix, and arranging the results of individual beat signals in a direction perpendicular to the range bin direction in the matrix, and representing the value of each process result (spectrum (dB)) in a height direction. The example of FIG. 3 has two peaks 91 and 92.

Figure 4:
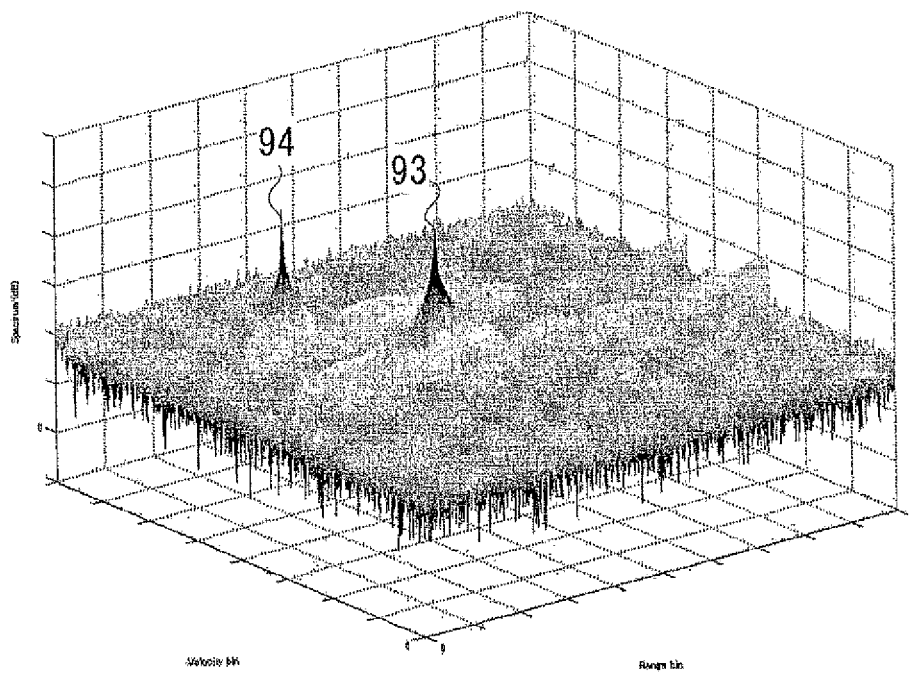
FIG. 4 is a view illustrating a result of a Fourier transform process of a velocity bin direction.

Now, relative velocity computation will be described. In a case where there is a relative velocity between the vehicle and the target, the FCM system detects a Doppler frequency between the beat signals, using phase change attributable to the Doppler frequency, thereby computing the relative velocity. In other words, if the relative velocity is 0, since there is no Doppler component between the reception signals, all of the phases of the reception signals related to the individual chirps become same. Meanwhile, in a case where there is a relative velocity between the vehicle and the target, a Doppler phase change occurs between the reception signals related to the individual chirps. Since peak information obtained by performing an FFT process on the beat signals includes such phase information, if the peak information of the same target obtained from the individual beat signals is arranged in time series, and a second FFT is performed, the Doppler frequency is obtained from the phase information, and a peak appears at the position of the obtained frequency. This FFT process extracts phase information for each of frequency points (hereinafter, also referred to as velocity bins) set at intervals of a predetermined frequency according to velocity resolution, and thus the peak appears at the velocity bin of a frequency corresponding to the relative velocity of the target. Therefore, it is possible to obtain the relative velocity of the target by detecting the peak frequency. FIG. 4 shows an example obtained by arranging the results of a second FFT process in the velocity bin direction in a matrix, and arranging the results of the second FFT process at frequency points determined at regular intervals, in the range bin direction, in the matrix, and representing the value of each process result (spectrum (dB)) in the height direction. The example of FIG. 4 has two peaks 93 and 94.

The A/D converters 5 (ch1 to ch4) acquire the beat signals SB from the mixers 4 (ch1 to ch4), respectively, and perform sampling on the beat signals SB which are analog signals, at a predetermined frequency, thereby converting the beat signals into digital signals. In the FCM system, since chirps having a period shorter than that in the FMCW system, the A/D converters 5 faster than those in the FMCW system are used.

The signal processing device 19 is a so-called computer having a processor 6 configured to perform arithmetic processing on signals according to a computer program, and a memory 16 for storing information related to arithmetic processing. The memory 16 may be composed of a plurality of memories, such as an auxiliary storage unit for storing the computer program and setting values and a main storage unit for temporarily storing information to be used in arithmetic processing. If electric power is supplied to the vehicle, the processor 6 executes the computer program, whereby the signal processing device 19 implements function units such as a transmission control unit 10, a frequency analyzing unit 11, a peak extracting unit 12, a bearing computing unit 13, and a distance/relative-velocity computing unit 14. For example, the transmission control unit 10 controls the signal generating unit 9 such that the signal generating unit generates a transmission signal on the basis of a plurality of preset parameters (first and second parameters to be described below), and outputs the transmission signal. In the present embodiment, the transmission control unit 10, the signal generating unit 9, the oscillator 8, and the transmitting antenna 7 constitute one form of a transmitting unit.

Figure 5:
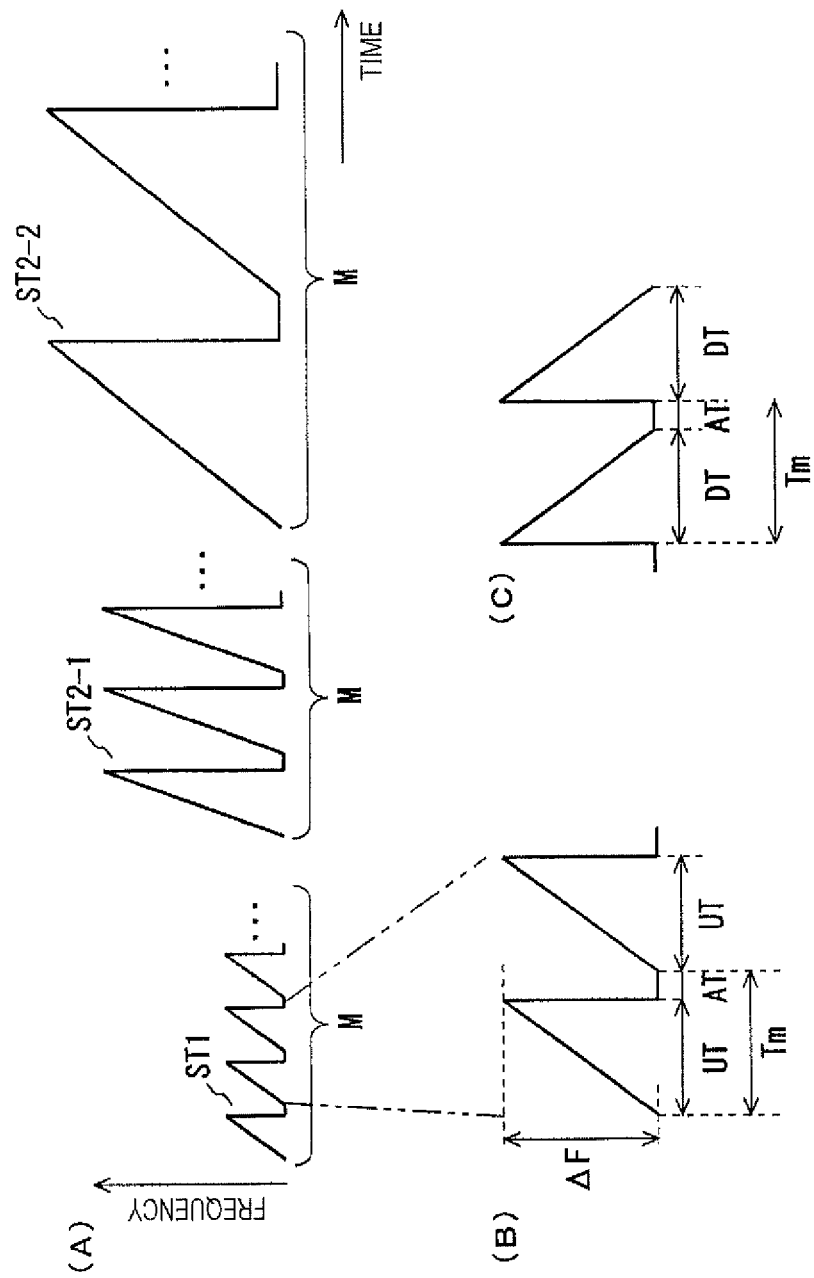
FIG. 5 is a view illustrating an example of a transmission signal.

FIG. 5 is a view illustrating examples of saw-tooth transmission signals ST which are transmitted by the transmitting unit. In FIG. 5, (A) shows portions of the transmission signals ST necessary for one scanning event, and (B) shows an enlarged view of a portion of a transmission signal ST. The transmitting unit transmits transmission signals of a plurality of modes having different waveforms, on the basis of a plurality of parameters. In the present embodiment, the transmitting unit transmits transmission signals of three modes on the basis of a first parameter and two second parameters (wherein one will be referred to as the second-group first parameter and the other one will be referred to as the second-group second parameter). However, the number of transmission signal modes is not limited to 3, and only two or more modes based on, at least the first and second parameters are needed.

In (B) of FIG. 5, each transmission signal has a bandwidth ΔF which is the height in the frequency direction represented by the longitudinal axis, and a period Tm in which transmission of a chirp is repeated. Each period Tm includes a radio-wave transmission period UT in which one chirp is transmitted, and an idle period AT which is a period from when transmission of one chirp finishes to when transmission of the next chirp starts. Also, the number of times of chirp transmission based on one parameter is the number M of chirps ((A) of FIG. 5).

Since a first transmission signal and two second transmission signals (wherein one will be referred to as the second-group first transmission signal and the other one will be referred to as the second-group second transmission signal) are transmitted as described above, the receiving units (the receiving antennae 3, the mixers 4, and the A/D converters 5) receive the reflected waves of the first, second-group first, and second-group second transmission signals from targets as first, second-group first, and second-group second reception signals, and generate beat signals with respect to the reception signals, respectively.

Since the reflected waves from a plurality of targets are superimposed and received as reception signals SR, the frequency analyzing unit 11 performs a process of separating frequency components based on the reflected waves from each target, from beat signals SB generated on the basis of the reception signals SR. For example, the frequency analyzing unit 11 performs an FFT process on the beat signals SB, thereby obtaining the process result for each of the range bins set at intervals of the predetermined frequency. Hereinafter, an FFT process for obtaining a process result for each range bin will also be referred to as an FFT process of a range bin direction. Further, the frequency analyzing unit 11 performs an FFT process on the process results of the FFT process of the range bin direction, for each of range bins common to the plurality of beat signals, thereby obtaining the process result for each of velocity bins set at intervals of the predetermined frequency. Hereinafter, an FFT process for obtaining a process result for each velocity bin will also be referred to as an FFT process of a velocity bin direction. In the present embodiment, as an example of a frequency analyzing process which is performed by the frequency analyzing unit 11, Fourier transform, particularly, fast Fourier transform is shown. However, the present invention is not limited thereto. As long as it is possible to obtain a frequency according to the distance between the vehicle and each target, and a frequency according to the relative velocity of each target, other frequency analyzing algorithms such as wavelet conversion may be used.

The peak extracting unit 12 detects individual peaks from the result of the FFT process of the range bin direction and the result of the FFT process of the velocity bin direction. The bearing computing unit 13 measures the bearing of each target on the basis of the reception signals received through the receiving antennae 3 (ch1 to ch4).

The distance/relative-velocity computing unit 14 obtains a distance and a relative velocity corresponding to each peak detected by the peak extracting unit 12. The distance/ relative-velocity computing unit 14 detects the frequency of each peak generated by the FFT process of the range bin direction, that is, a range bin at which a peak according to the distance between each target and the vehicle has been generated, thereby obtaining the distance to the corresponding target. Especially, the distance/relative-velocity computing unit 14 of the present embodiment obtains the distance between each target and the vehicle by computing a first distance, and two second distances (wherein one will be referred to as the second-group first distance, and the other one will be referred to as the second-group second distance) on the basis of the first, second-group first, and second-group second reception signals, and selecting any one of the first, second-group first, and second-group second distances.

Also, the distance/relative-velocity computing unit 14 detects the frequency of each peak generated by the FFT process of the velocity bin direction, that is, each velocity bin at which a peak according to the relative velocity of a target has been generated, thereby obtaining the relative velocity of the corresponding target. Especially, the distance/relative-velocity computing unit 14 of the present embodiment obtains the relative velocity between each target and the vehicle by computing a first, second-group first, and second-group second relative velocities on the basis of the first, second-group first, and second-group second reception signals, and selecting any one of the first, second-group first, and second-group second distances. In other words, in the present embodiment, the distance/relative-velocity computing unit 14 is one form of a measuring unit.

The signal processing device 19 is configured, for example, as a micro control unit (MCU). However, the present invention is not limited thereto. As long as it is possible to implement the functions of the individual function units 10 to 14, any other configuration can be used. Also, the processor 6 executes the computer program in cooperation with the memory 16, whereby the individual function units 10 to 14 are implemented. However, for convenience of explanation, in FIG. 2, the individual function units are shown in the processor 6. Also, these function units are not limited to components which the general-purpose processor 6 implements on the basis of the computer program (software). For example, all or some of the function units may be implemented by a dedicated arithmetic circuit (hardware) disposed inside or outside the processor 6.

As described above, the radar device 1 of the present embodiment performs measurement on the basis of the plurality of parameters, and performs determination on the state of aliasing, and selects a high-accuracy measurement value as a measurement result from measurement values in which aliasing has not occurred. Therefore, even though aliasing has occurred in the measurement values based on the second-group first and second-group second parameters, it is possible to obtain a measurement result having as high accuracy as possible.

(With Respect to Aliasing)

As described above, in the FCM system, velocity measurement is performed by performing an FFT process on the phase change between the reception signals SR received consecutively. At this time, if the relative velocity of the target exceeds the detection velocity range, velocity aliasing occurs, and a relative velocity in the detection range is falsely detected as the relative velocity of the target. The reason is that, since velocity measurement is performed on the basis of the phase change between the reception signals SR, a Doppler frequency is sampled at the period of the reception signals SR, that is the period of chirps, and twice the period of chirps becomes the upper limit of detection velocity by the sampling theorem, and if one period of the Doppler frequency becomes less than twice the period of chirps (in other words, a case where the target has a relative velocity at which the target moves by a distance equal to or longer than half of the Doppler frequency between chirps), the Doppler frequency cannot be correctly sampled, and is detected as an alias signal (aliasing).

Figure 6:
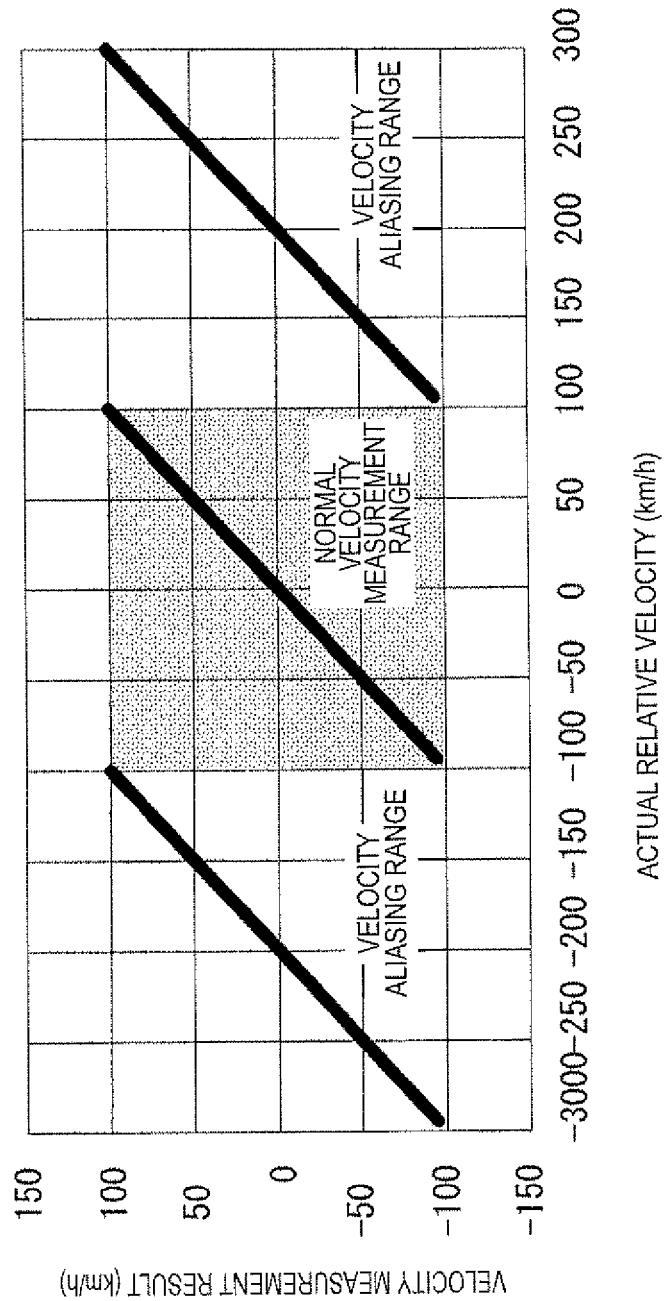
FIG. 6 is an explanatory view of velocity aliasing.

FIG. 6 is an explanatory view of aliasing in velocity, and shows a graph illustrating the relation between actual relative velocities and velocity measurement results in a case where a velocity detection range Vmax is 100 km/h. In the graph of FIG. 6, the actual relative velocities are shown on the transverse axis, and the velocity measurement results are shown on the longitudinal axis, and a shaded portion (between −100 km/h and 100 km/h) represents a range in which velocity measurement results are equal to actual relative velocities, that is, a range in which velocity aliasing does not occur, and the other portions represent ranges in which aliasing velocity occurs.

In the range between −100 km/h and 100 km/h, the velocity measurement results are equal to the actual relative velocities, like a case where an actual relative velocity is −50 km/h and a velocity measurement result also is −50 km/h, and a case where an actual relative velocity is 0 km/h and a velocity measurement result also is 0 km/h. In other words, the velocity measurement results based on bins at which peaks have been generated are equal to the actual relative velocities. However, if an actual relative velocity exceeds the detection range Vmax, a peak based on the corresponding actual relative velocity appears at a bin which is an aliasing position in the detection range, and thus a velocity which is not equal to the actual relative velocity is falsely detected as a velocity measurement result. For example, in a case where an actual relative velocity is −250 km/h, −50 km/h is falsely detected as a velocity measurement result, and in a case where an actual relative velocity is 300 km/h, 100 km/h is falsely detected as a velocity measurement result.

In other words, when an actual relative velocity is $V_R$, and a velocity measurement result is $V_{FFT}$, if $V_R$ is in a range larger than −Vmax and equal to or less than Vmax (in FIG. 6, the range larger than −100 km/h and equal to or less than 100 km/h), $V_R$ and $V_{FFT}$ become equal to each other. However, as described above, when the actual relative velocity is out of that range, a relative velocity in the detection range is falsely detected, and the relation between $V_R$ and $V_{FFT}$ is expressed as Expression 1.

$$V_{FFT} = ((V_R + V\text{max}) \bmod 2 \cdot V\text{max}) - V\text{max} \qquad \text{(Expression 1)}$$

Also, even with respect to the distance between a target and the vehicle, if the distance of the target exceeds a detection range, aliasing occurs, and a distance in the detection range is falsely detected. The reason is that, if a frequency corresponding to the distance of a target exceeds half of a sampling frequency for sampling on beat signals, the frequency corresponding to the distance is not correctly sampled, and is detected as an aliasing signal (aliasing).

As described above, if the distance or relative velocity of a target gets out of the detection range, aliasing occurs. For this reason, with respect to the distances and relative velocities of targets which can be detected, it is required to highly set the requirement specifications of the radar device 1, that is, it is required to widely set the detection ranges. However, in order to widely set the detection ranges, for example, it is required to set a high sampling frequency, and the A/D converters 5 needs to be fast. Due to these restrictions on design, there is a limit in widely setting the detection velocity range Vmax.

For this reason, in the present embodiment, the radar device generates a first transmission signal based on a first parameter having a first detection range for relative velocity or distance which is the same as or wider than that of the requirement specifications, and a second transmission signal based on a second parameter having a second relative-velocity or distance detection range narrower than the first detection range and having a resolution higher than that of the first parameter, and transmits the first and second transmission signals. Then, the radar device receives the reflected waves of the first and second transmission signals from each target, as first and second reception signals, and computes first and second relative velocities and first and second distances, on the basis of the first and second reception signals, and selects one of the first relative velocity and the second relative velocity, and selects one of the first distance and the second distance, thereby obtaining the result of measurement of the relative velocity or distance of the corresponding target.

Specifically, the measuring unit compares the first distance and the second distance. If the first distance corresponds to the second distance, the measuring unit selects the second distance as the measured result; whereas if the first distance does not correspond to the second distance, the measuring unit selects the first distance as the measured result. Also, the measuring unit compares the first relative velocity and the second relative velocity. If the first relative velocity corresponds to the second relative velocity, the measuring unit selects the second relative velocity as the measured result; whereas if the first relative velocity does not correspond to the second relative velocity, the measuring unit selects the first relative velocity as the measured result.

In this case, in a case of measurement based on the first parameter, in the detection ranges of the requirement specifications, aliasing does not occur; however, the resolution is lower than that of the second parameter. In contrast, in a case of measurement based on the second parameter, the resolution is higher than that of the first parameter; however, there is a possibility that aliasing may occur in the detection ranges of the requirement specifications. For this reason, in a case where the measurement result based on the first parameter corresponds to the measurement result based on the second parameter, since it can be considered that aliasing has not occurred in the measurement based on the second parameter, the measurement result based on the second parameter having high accuracy (high resolution) is used, and in a case where the measurement result based on the first parameter does not correspond to the measurement result based on the second parameter, since it can be considered that aliasing has occurred in the measurement based on the second parameter, the measurement result based on the first parameter is used. Therefore, it is possible to obtain a measurement result having as high accuracy as possible, according to the state of aliasing.

As described above, the radar device 1 of the present embodiment performs measurement on the basis of the plurality of parameters, and performs determination on the state of aliasing, and selects a high-accuracy measurement value as a measurement result from measurement values in which aliasing has not occurred. Therefore, even though aliasing has occurred in the measurement values based on the second-group first and second-group second parameters, it is possible to obtain a measurement result having as high accuracy as possible.

(Measuring Method)

Hereinafter, a process flow which the processor 6 performs in a case where electric power is supplied from the vehicle to the radar device 1 will be described with reference to the flow chart of FIG. 7. In a case where the driving source of the vehicle is operating, for example, if the driving source is an internal combustion engine, in a case where an ignition switch is in an ON state, or if the driving source is a hybrid system or an EV (electric vehicle) system, in a case where the power of the system is in an ON state, the processor 6 repeats the following process flow.

In STEP S10, the processor 6 instructs the signal generating unit 9 to perform switching to modulation on a first transmission signal ST1 according to the first parameter preset according to the requirement specifications of the radar device 1. Subsequently, in STEP S20, the processor 6 instructs the signal generating unit 9 to transmit the first transmission signal ST1.

Thereafter, if the reflected waves of the first transmission signal ST1 from a target are received, and are converted into first reception signals SR by A/D conversion of the A/D converters 5 (ch1 to ch4), in STEP S30, the processor 6 acquires the first reception signals from the receiving units, and performs a two-dimensional FFT process on the first reception signals, thereby obtaining a first distance and a first relative velocity.

Subsequently, in STEP S40, the processor 6 instructs the signal generating unit 9 to perform switching to modulation on a second-group first transmission signal ST according to the second-group first parameter. Next, in STEP S50, the processor 6 instructs the signal generating unit 9 to transmit the second-group first transmission signal ST.

Thereafter, if the reflected waves of the second-group first transmission signal ST from the target are received, and are converted into second-group first reception signals SR by A/D conversion of the A/D converters 5 (ch1 to ch4), in STEP S60, the processor 6 acquires the second-group first reception signals from the receiving units, and performs a two-dimensional FFT process on the second-group first reception signals, thereby obtaining a second-group first distance and a second-group first relative velocity.

Subsequently, in STEP S70, the processor 6 instructs the signal generating unit 9 to perform switching to modulation on a second-group second transmission signal ST according to the second-group second parameter. Next, in STEP S80, the processor 6 instructs the signal generating unit 9 to transmit the second-group second transmission signal ST.

Thereafter, if the reflected waves of the second-group second transmission signal ST from the target are received, and are converted into second-group second reception signals SR by A/D conversion of the A/D converters 5 (ch1 to ch4), in STEP S90, the processor 6 acquires the second-group second reception signals from the receiving units, and performs a two-dimensional FFT process on the second-group second reception signals, thereby obtaining a second-group second distance and a second-group second relative velocity.

Subsequently, in STEP S100, the processor 6 determines whether aliasing has occurred, by comparing the distance and the relative velocity based on the first parameter with the distance and the relative velocity based on each second parameter. For example, if the first distance corresponds to the second-group first distance, the processor determines that aliasing has not occurred in the second-group first distance; whereas, if the first distance does not correspond to the second-group first distance, the processor determines that aliasing has occurred in the second-group first distance.

Similarly, if the first distance corresponds to the second-group second distance, the processor determines that aliasing has not occurred in the second-group second distance; whereas, if the first distance does not correspond to the second-group second distance, the processor determines that aliasing has occurred in the second-group second distance. Also, if the first relative velocity corresponds to the second-group first relative velocity, the processor determines that aliasing has not occurred in the second-group first relative velocity; whereas, if the first relative velocity does not correspond to the second-group first relative velocity, the processor determines that aliasing has occurred in the second-group first relative velocity. Similarly, if the first relative velocity corresponds to the second-group second relative velocity, the processor determines that aliasing has not occurred in the second-group second relative velocity; whereas, if the first relative velocity does not correspond to the second-group second relative velocity, the processor determines that aliasing has occurred in the second-group second relative velocity. In the present embodiment, the processor compares the first distance with each of the second-group first distance and the second-group second distance, thereby determining whether aliasing has occurred. However, the present invention is not limited thereto, and it is also possible to determine whether the value of the first distance is within each of a second-group first detection range and a second-group second detection range. For example, the second-group first detection range and the second-group second detection range may be stored as a data table in a memory or the like, in advance. In this case, if the value of the first distance is within the second-group first detection range or the second-group second detection range read from the data table, the processor 6 may determine that aliasing has not occurred. Meanwhile, if the value of the first distance is not within the second-group first detection range or the second-group second detection range, the processor 6 may determine that aliasing has occurred.

Subsequently, in STEP S105, from distances and relative velocities in which aliasing has not occurred, the processor 6 selects a distance and a relative velocity having the highest accuracy (the highest resolution), and outputs them.

As described above, in the present embodiment, in one scanning event, in other words, in a process of obtaining the results of one measuring event, the radar device transmits the transmission signals ST based on the plurality of parameters, in turn, and performs determination on aliasing with respect to the distances or the relative velocities measured on the basis of the individual transmission signals ST, and selects a distance or a relative velocity having the highest accuracy, as the result of the measurement, from distances or relative velocities in which aliasing has not occurred.

Therefore, it is possible to set a plurality of parameters, such as a parameter having a wide detection range and a low resolution, and a parameter having a narrow detection range and a high resolution, and it is possible to select a distance or a relative velocity having high accuracy, from distances or relative velocities measured on the basis of the plurality of parameters.

Figure 7:
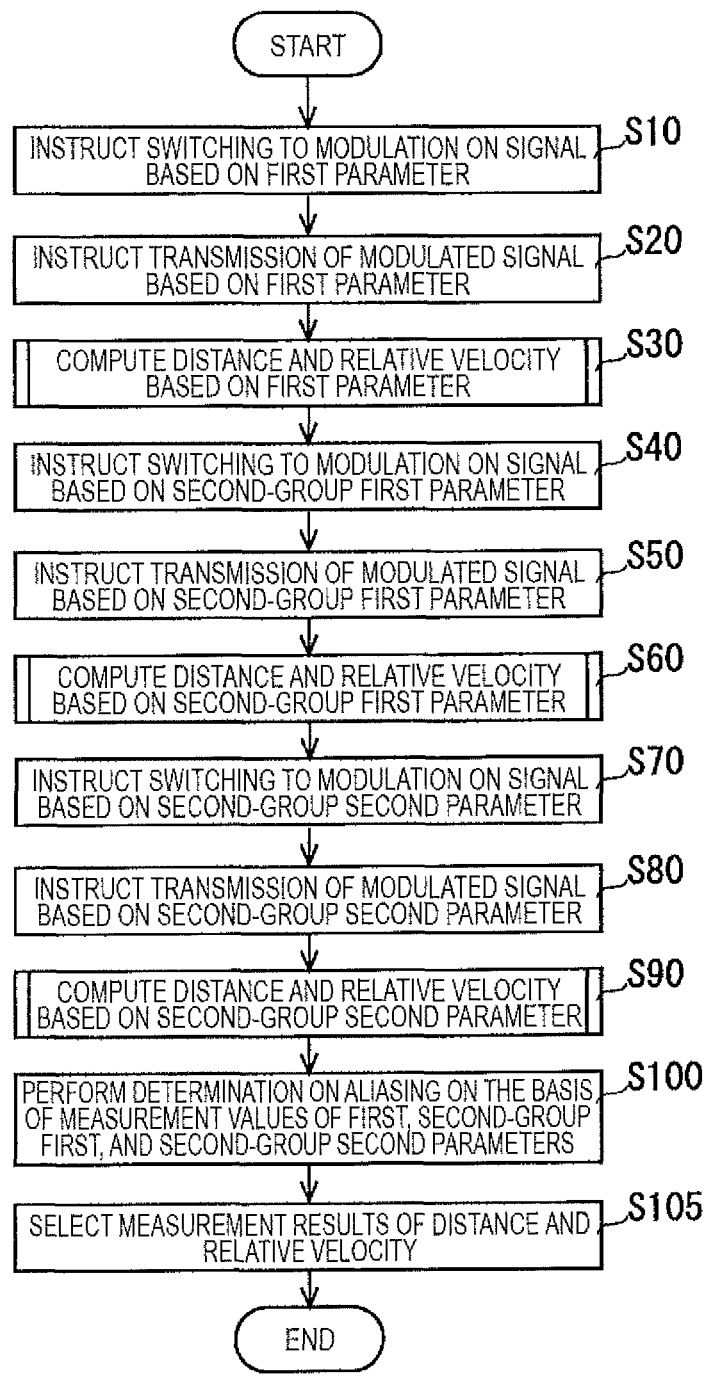
FIG. 7 is a flow chart of signal processing.

In the example of FIG. 7, measurement is performed on the basis of the first parameter, and two second parameters, that is, the second-group first and second-group second parameters. However, the number of second parameters is not limited to 2, and may be one, or three or more.

Figure 8:
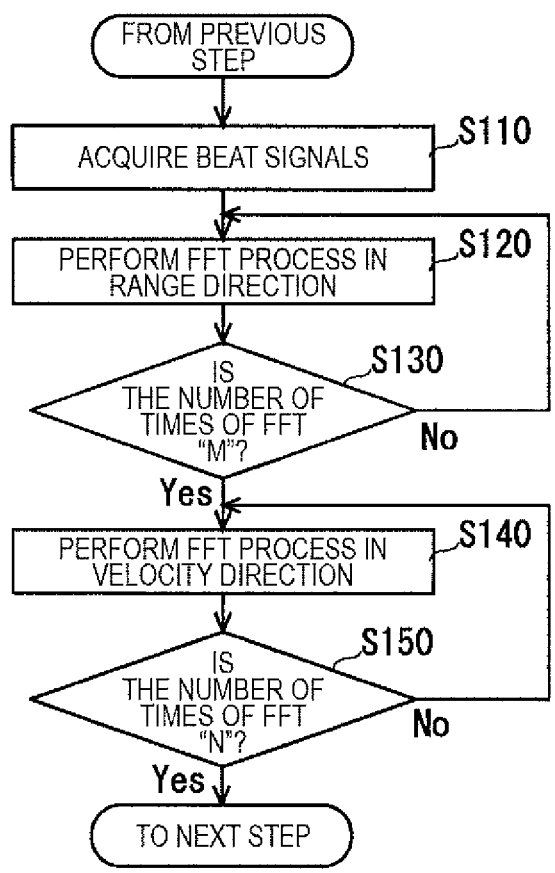
FIG. 8 is an explanatory view of a two-dimensional FFT process.

FIG. 8 is a view illustrating a specific example of the two-dimensional FFT process. In STEPS S30, S60, and S90 of FIG. 7, as shown in FIG. 8, in STEP S110, the processor 6 first acquires the beat signals generated on the basis of the reception signals SR corresponding to the individual transmission signals ST. These beat signals SB are time-series data obtained by performing A/D conversion at a predetermined sampling frequency. In STEP S120, the processor 6 analyzes one of the beat signals in time series by performing an FFT process on the beat signal in the range bin direction. The processor 6 repeats the process of STEP S120 on each of the M-number of beat signals SB (STEP S130).

For explanation, (C) of FIG. 1 shows a matrix pattern in which values R1 to RJ obtained at predetermined frequency intervals as the result BF1 of the FFT process of the beat signal B1 are arranged at the range bins RA1 to RAJ of the corresponding frequencies, and the results BF2 to BFM of the FFT processes of the individual beat signals B2 to BM are arranged in the direction perpendicular to the range bins. FIG. 3 shows an example in which the results of Fourier transform processes of the range bin direction are arranged on a plane as described above and which represents the values (spectrum (dB)) of the individual process results in a height direction. As described above, as the result of the Fourier transform process in the range bin direction, a peak occurs at a frequency (a range bin) according to the distance of each target. Therefore, by detecting the peak frequency, it is possible to obtain the distance of the corresponding target. However, this matrix-like arrangement is for convenience of explanation, and is not limited to a case where the result values are physically stored in that arrangement.

Subsequently, in STEP S140, with respect to the results of the Fourier transform processes of the range bin direction, the processor 6 performs an FFT process of the velocity bin direction on time-series data related to the same distance, that is, the same range bin. At this time, the processor 6 repeats the FFT process of STEP S140 until the number of FFT processes reaches a predetermined number $N_R$ of times, that is, the number $N_R$ of range bins (STEP S150). Specifically, if the number of FFT processes is not $N_R$ ("No" in STEP S150), the processor returns to STEP S140; whereas if the number of FFT processes is $N_R$ ("Yes" in STEP S150), the processor proceeds to STEP S30. FIG. 4 shows an example obtained by arranging the results of the FFT process of the velocity bin direction in a matrix of the range bin direction and the velocity bin direction and representing the values of the process results in the height direction as shown in FIG. 3. As described above, as the result of the Fourier transform process in the velocity bin direction, a peak is generated at a frequency (a velocity bin) according to the relative velocity of each target. Therefore, by detecting this peak frequency, it is possible to obtain the relative velocity of the corresponding target.

As described above, the radar device 1 of the present embodiment performs measurement on the basis of the plurality of parameters, and performs determination on the state of aliasing, and selects a high-accuracy measurement value as a measurement result from measurement values in which aliasing has not occurred. Therefore, even though aliasing has occurred in the measurement values based on the second-group first and second-group second parameters, it is possible to obtain a measurement result having as high accuracy as possible.

(Specific Examples of Parameters)

Figure 9:
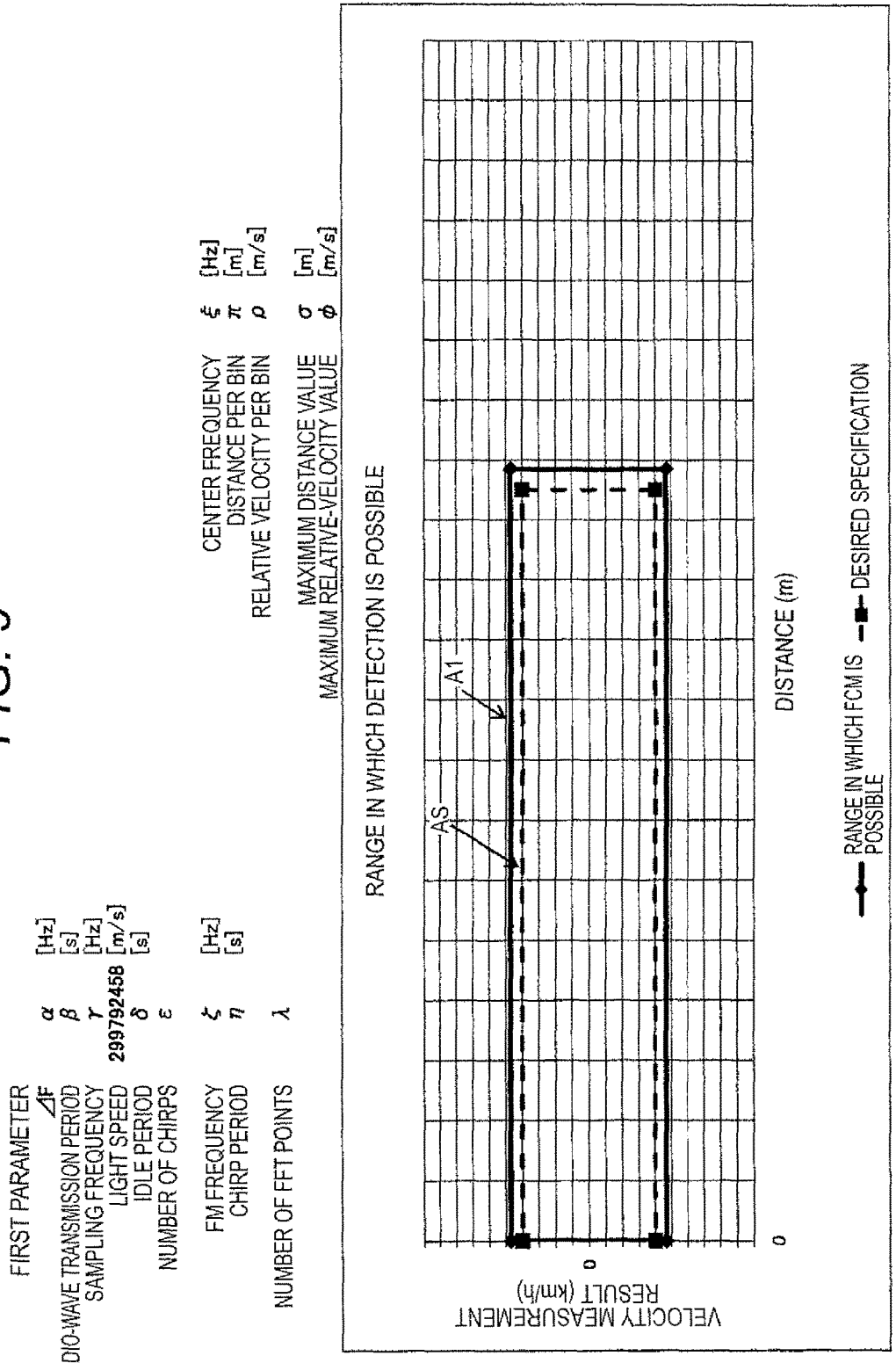
FIG. 9 is a view illustrating a first parameter, and a range in which detection is possible in a case of performing measurement based on the first parameter.

FIG. 9 is a view illustrating the first parameter, and a range in which detection is possible in a case of performing measurement using the first transmission signal based on the first parameter.

It is assumed that, in the first parameter, the bandwidth ΔF is α Hz, and the radio-wave transmission period UT is β seconds, and the sampling frequency is γ Hz, and the light speed is 299792458 m/s, and the idle period AT is δ seconds, and the number M of chirps is ε, and the FM frequency is ζ Hz, and the chirp period Tm is η seconds, and the number of FFT points is λ, and the center frequency is ξ Hz.

The number of FFT points is the number of FFT process results in a case of discretely obtaining the results of FFT processes at predetermined frequency intervals.

The sampling frequency is a frequency which is used for the A/D converters 5 to perform sampling on beat signals, and the upper limit thereof is actually restricted according to the specifications of the A/D converters 5. In this example, it is assumed that all of the first parameter and the second parameters have γ Hz.

Therefore, the distances at intervals of one bin from those values can be determined as Expression 2.

$$[\text{DISTANCE}] \propto \frac{[\text{LIGHTSPEED}] \times [\text{SAMPLING FREQUENCY}]}{4 \times \Delta F \times [\text{FM FREQUENCY}] \times [\text{NUMBER OF FFT POINTS}]} \quad (\text{Expression 2})$$

In a case where the first parameter has the above described values, and π is obtained as the distance per bin (resolution) by Expression 2, it is possible to obtain σ as the distance detection range (the maximum distance value) by multiplying the distance per bin by the number of range bins (half of the number of FFT points).

Also, the relative velocity per bin can be determined by Expression 3.

$$[\text{RELATIVE VELOCITY}] \propto \frac{[\text{LIGHTSPEED}]}{[\text{CENTER FREQUENCY}] \times (UT + AT) \times [M]} \quad (\text{Expression 3})$$

In Expression 3, "UT" represents the radio-wave transmission period, and "AT" represents the idle period, and "M" is the number of chirps.

In a case where the first parameter has the above described values, and ρ is obtained as the relative velocity per bin (resolution) by Expression 3, φ is obtained as the relative-velocity detection range (the maximum relative-velocity value) by multiplying the relative velocity ρ per bin by the number of velocity bins (one-fourth of the number M of chirps).

The graph of FIG. 9 shows the distance detection range and the relative-velocity detection range. In the graph of FIG. 9, the transverse axis represents distance, and the longitudinal axis represents relative velocity, and an area AS shown by a dotted line is a detection range in a case of performing measurement on the basis of the requirement specifications, and an area A1 shown by a bold solid line is the detection range in the case of performing measurement on the basis of the first parameter.

Figure 10:
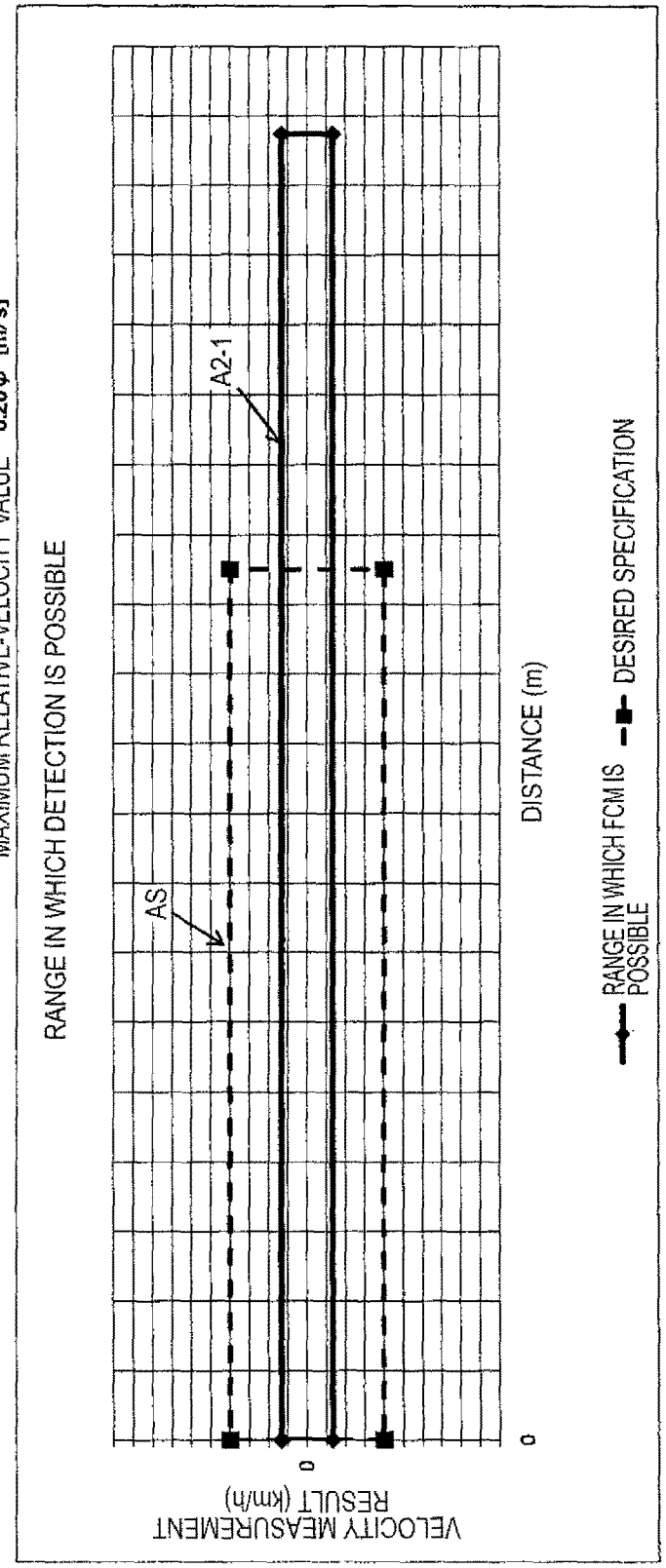
FIG. 10 is a view illustrating one of second parameters (hereinafter, referred to as the "second-group first parameter"), and a range in which detection is possible in a case of performing measurement based on the second-group first parameter.

FIG. 10 is a view illustrating the second-group first parameter, and a range in which detection is possible in a case of performing measurement using the second-group first transmission signal based on the second-group first parameter. It is assumed that, in the second-group first parameter, the bandwidth ΔF is 5.71α Hz, and the radio-wave transmission period UT is 8.33β seconds, and the sampling frequency is γ Hz, and the idle period AT is 0.33δ seconds, and the number M of chirps is ε, and the FM frequency is 0.12ζ Hz, and the chirp period (cycle) Tm is 3.53η seconds, and the number of FFT points is 8λ, and the center frequency is ξ Hz.

In the case where the second-group first parameter has the above described values, the distance (resolution) per one bin can be obtained by Expression 2. While the distance per one bin based on the first parameter is π, 0.18π is obtained as the distance per one bin based on the second-group first parameter. Also, the distance detection range (the maximum distance value) can be obtained by multiplying the distance per bin by the number of range bins (half of the number of FFT points). While the distance detection range based on the first parameter is σ, 1.46σ is obtained as the distance detection range based on the second-group first parameter.

Also, in the case where the second-group first parameter has the above described values, the relative velocity per one bin (resolution) can be obtained by Expression 3. While the relative velocity per one bin based on the first parameter is ρ, 0.28ρ is obtained as the relative velocity per one bin based on the second-group first parameter. Also, the relative-velocity detection range (the maximum relative-velocity value) can be obtained by multiplying the relative velocity per one bin by the number of velocity bins (one-fourth of the number M of chirps). While the relative-velocity detection range based on the first parameter is φ, 0.28φ is obtained as the relative-velocity detection range based on the second-group first parameter. The graph of FIG. 10 shows the distance detection range and the relative-velocity detection range. In the graph of FIG. 10, the transverse axis represents distance, and the longitudinal axis represents relative velocity, and an area AS shown by a dotted line is the detection range in a case of performing measurement on the basis of the requirement specifications, and an area A2-1 shown by a bold solid line is the detection range in the case of performing measurement on the basis of the second-group first parameter.

Figure 11:
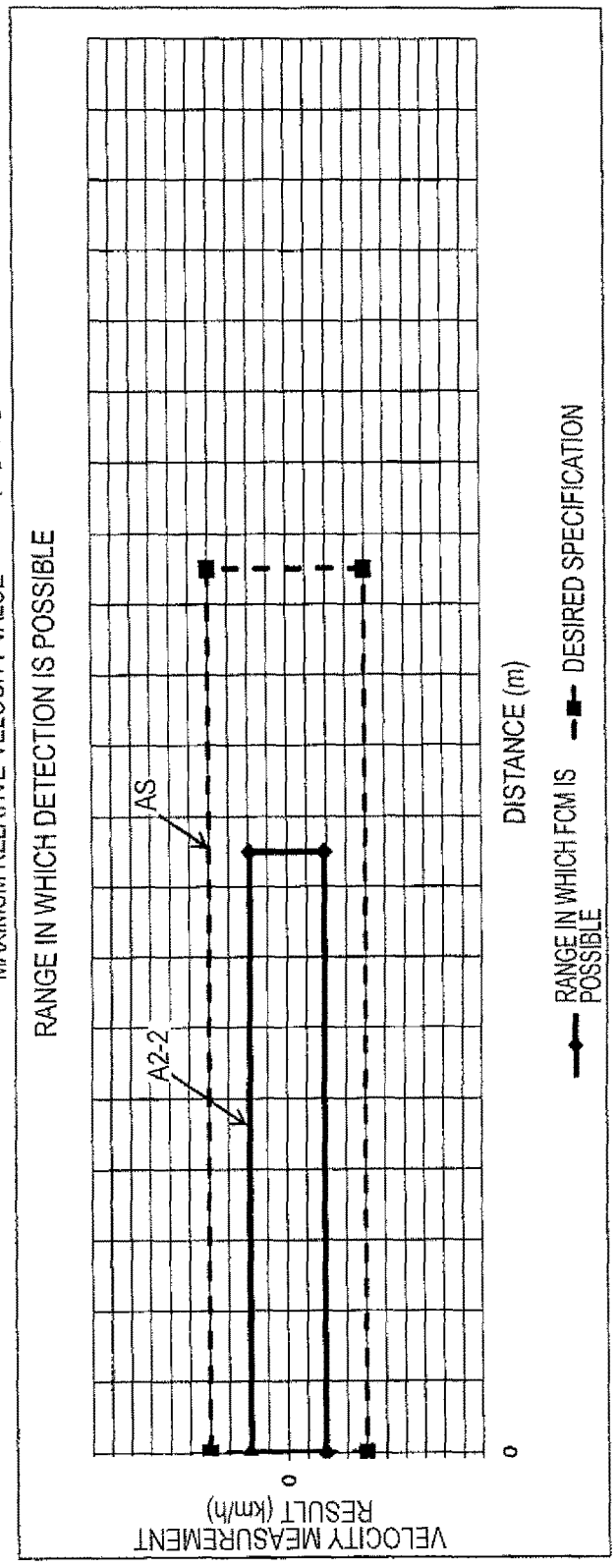
FIG. 11 is a view illustrating another one of the second parameters (hereinafter, referred to as the "second-group second parameter"), and a range in which detection is possible in a case of performing measurement based on the second-group second parameter.

FIG. 11 is a view illustrating the second-group second parameter, and a range in which detection is possible in a case of performing measurement using the second-group second transmission signal based on the second-group second parameter. It is assumed that, in the second-group second parameter, the bandwidth ΔF is 4.29α Hz, and the radio-wave transmission period UT is 2.83β seconds, and the sampling frequency is γ Hz, and the idle period AT is 2.22δ seconds, and the number M of chirps is ε, and the FM frequency is 0.35ζ Hz, and the chirp period (cycle) Tm is 2.47η seconds, and the number of FFT points is 4λ.

In the case where the second-group second parameter has the above described values, the distance (resolution) per one bin can be obtained by Expression 2. While the distance per one bin based on the first parameter is π, 0.17π is obtained as the distance per one bin based on the second-group second parameter. Further, the distance detection range (the maximum distance value) can be obtained by multiplying the distance per bin by the number of range bins (half of the number of FFT points). While the distance detection range based on the first parameter is σ, 0.66σ is obtained as the distance detection range based on the second-group second parameter.

Also, in the case where the second-group first parameter takes the above described values, the relative velocity per one bin (resolution) can be obtained by Expression 3. While the relative velocity per one bin based on the first parameter is ρ, 0.41ρ is obtained as the relative velocity per one bin based on the second-group second parameter. Also, the relative-velocity detection range (the maximum relative-velocity value) can be obtained by multiplying the relative velocity per one bin by the number of velocity bins (one-fourth of the number M of chirps). While the relative-velocity detection range based on the first parameter is φ, whereas 0.41φ is obtained as the relative-velocity detection range based on the second-group second parameter. The graph of FIG. 11 shows the distance detection range and the relative-velocity detection range. In the graph of FIG. 11, the transverse axis represents distance, and the longitudinal axis represents relative velocity, and an area AS shown by a dotted line is a detection range in a case of performing measurement on the basis of the requirement specifications, and an area A2-2 shown by a bold solid line is the detection range in the case of performing measurement on the basis of the second-group second parameter.

As shown in FIGS. 9 to 11, the first, second-group first, and second-group second parameters are different in their distance detection ranges, their relative-velocity detection ranges, and their resolutions. The first parameter satisfies the distance and relative-velocity detection ranges of the requirement specifications, and thus in the detection ranges of the requirement specifications, aliasing does not occur; however, its resolution is lower than those of the second-group first and second-group second parameters.

The second-group first parameter exceeds the distance detection range of the requirement specifications, and thus in the distance detection range of the requirement specifications, aliasing does not occur; however, since its relative-velocity detection range is narrower than that of the requirement specifications, there is a possibility that aliasing may occur even in the relative-velocity detection range of the requirement specifications. Also, the distance resolution is higher than that of the first parameter, and is lower than that of the second-group second parameter. Further, the relative-velocity resolution is higher than those of the first and second-group second parameters.

The second-group second parameter has a distance detection range and a relative-velocity detection range narrower than those of the requirement specifications, and thus there is a possibility that aliasing may occur in the detection ranges of the requirement specifications. Also, the distance resolution is higher than those of the first and second-group first parameters. Further, the relative-velocity resolution is higher than that of the first parameter, and is lower than that of the second-group first parameter.

As described above, since the detection ranges and resolutions of the individual parameters are different, the radar device 1 performs determination on aliasing by comparing the measurement values based on the first parameter with the measurement values based on the second-group first and second-group second parameters, and selects measurement values having the highest accuracy, as the measurement results, from measurement values in which aliasing has not occurred.

Figure 12:
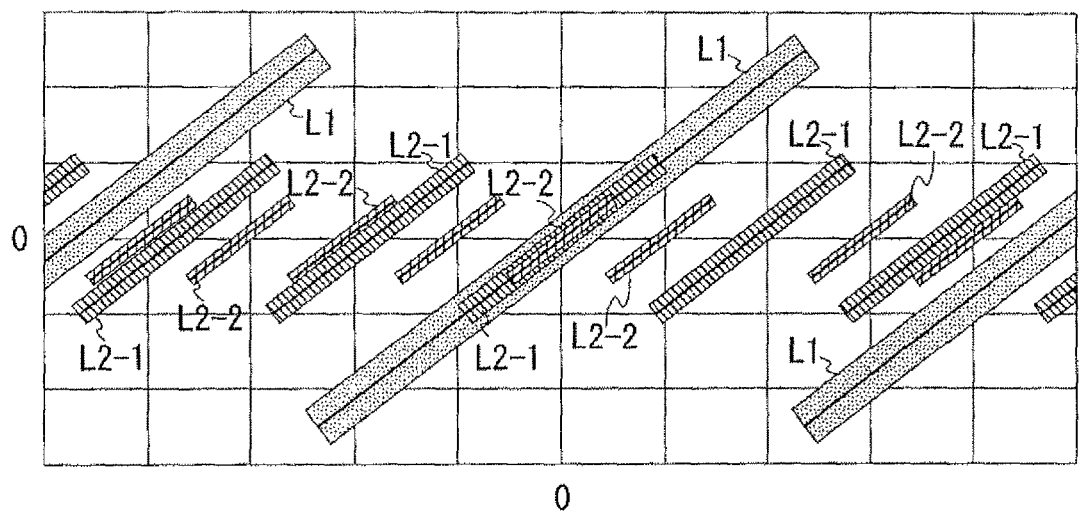
FIG. 12 is a view illustrating the relation between actual relative velocities and relative velocity measurement values based on the first, second-group first, and second-group second parameters.

FIG. 12 is a view illustrating the relation between actual relative velocities and the measurement values of the relative velocities based on the first, second-group first, and second-group second parameters. In FIG. 12, actual relative velocities are shown on the transverse axis, and measurement values are shown on the longitudinal axis, and lines representing correlations of cases of performing measurement on the basis of the first, second-group first, and second-group second parameters are shown by L1, L2-1, and L2-2, respectively. Also, in each of the lines L1, L2-1, and L2-2, the center value is shown by a solid line, and the relative velocity (resolution) per one bin is shown by hatching.

As shown in FIG. 12, in a range in which there is no aliasing in the relative-velocity measurement values based on the second-group first parameter, specifically, in the range between −0.28φ m/s and 0.28φ m/s, a line L2-2 based on the second-group first parameter overlaps a line L1 based on the first parameter, and in the other ranges, lines L2-1 do not overlap lines L1 Therefore, if the measurement value based on the second-group first parameter corresponds to the measurement value based on the first parameter, it is possible to determine that the line L2-1 overlaps the line L1, that is, aliasing has not occurred in the measurement value based on the second-group first parameter. Meanwhile, if the measurement value based on the second-group first parameter does not correspond to the measurement value based on the first parameter, it is possible to determine that the line L2-1 does not overlap the line L1, that is, aliasing has occurred in the measurement value based on the second-group first parameter.

Similarly, if the measurement value based on the second-group second parameter corresponds to the measurement value based on the first parameter, it is possible to determine that the line L2-2 overlaps the line L1, that is, aliasing has not occurred in the measurement value based on the second-group second parameter. Meanwhile, if the measurement value based on the second-group second parameter corresponds to the measurement value based on the first parameter, it is possible to determine that the line L2-2 does not overlap the line L1, aliasing has occurred in the measurement value based on the second-group second parameter.

Here, the state where the measurement value based on the second-group first parameter or the second-group second parameter corresponds to the measurement value based on the first parameter is not limited to a state where the measurement value based on the second-group first parameter or the second-group second parameter is the same as the measurement value based on the first parameter. Since discrete values of individual bins are obtained as measurement values based on the individual parameters, even in a case of performing measurement on the same actual relative velocity in a range in which aliasing does not occur, the measurement values based on the individual parameters may be different. For example, in a case of performing measurement based on the second-group first parameter, the actual relative-velocity range between −0.28φ m/s and 0.28φ m/s, 0 m/s is obtained as a measurement value. In contrast, in a case of performing measurement based on the first parameter, in an actual relative-velocity range between −φ m/s and φ m/s, 0 m/s is obtained as a measurement value. Therefore, in a case where an actual relative velocity is 0.9φ m/s, by measurement based on the second-group first parameter, 0.98φ m/s is obtained as a measurement value; whereas, by measurement based on the first parameter, 0 m/s is obtained. The measurement value 0.98φ based on the second-group first parameter and the measurement value 0 m/s based on the first parameter are measurement values based on the same actual relative velocity, and are values corresponding to each other. In other words, in a case where ranges having the measurement values based on the individual parameters as their centers and each corresponding to the relative velocity per bin (resolution) overlap each other, the measurement values are values corresponding to each other.

As described above, in a case where it is determined as the result of determination on aliasing that both of the measurement values based on the second-group first parameter and the second-group second parameter correspond to the measurement value based on the first parameter, the measurement value based on the second-group first parameter is used as the measured result. Also, in a case of determining that only the measurement value based on the second-group second parameter corresponds to the measurement value based on the first parameter, the measurement value based on the second-group second parameter having accuracy higher than that of the first parameter. Also, in a case of determining that both of the measurement values based on the second-group first parameter and the second-group second parameter do not correspond to the measurement value based on the first parameter, the measurement value based on the first parameter and having no aliasing is used as the measured result.

Similarly in the relative-velocity measurement of FIG. 12, even with respect to distance, if the measurement value based on the second-group first parameter or the second-group second parameter corresponds to the measurement value based on the first parameter, it is possible to determine that aliasing has not occurred in the measurement value based on the second-group first parameter or the second-group second parameter, and if the measurement value based on the second-group first parameter or the second-group second parameter does not correspond to the measurement value based on the first parameter, it is possible to determine that aliasing has occurred in the measurement value based on the second-group first parameter or the second-group second parameter.

Also, in the above described example, in distance measurement and relative-velocity measurement, the same parameters are used. However, the present invention is not limited thereto, and in distance measurement and relative-velocity measurement, different feeling parameters may be used. For example, it is also possible to perform relative-velocity measurement using the parameters of FIGS. 9 to 11 as first, second-group first, and second-group second parameters, respectively, and perform distance measurement using the parameters of FIGS. 10 and 11 as a first parameter and a second parameter, respectively.

As described above, the radar device 1 of the present embodiment performs measurement on the basis of the plurality of parameters, and performs determination on the state of aliasing, and selects a high-accuracy measurement value as a measurement result from measurement values in which aliasing has not occurred. Therefore, even though aliasing has occurred in the measurement values based on the second-group first and second-group second parameters, it is possible to obtain a measurement result having as high accuracy as possible.

<Modifications>

In the above described embodiment, on the basis of each of the first, second-group first, and second-group second parameters, the radar device consecutively transmits M-number of chirps of the transmission signal. However, the present invention is not limited thereto. The radar device may transmit the chirps of the transmission signals based on the parameters, one by one, in turn.

Figure 13:
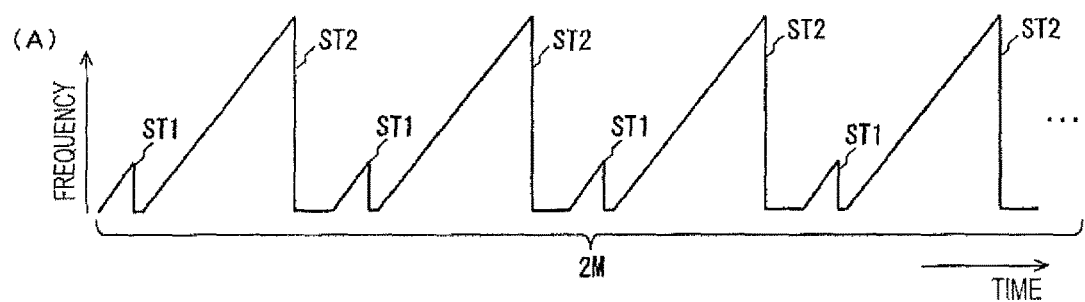
FIG. 13 is a view illustrating an example in which a chirp ST1 based on the first parameter (FIG. 9), and a chirp ST2 based on a second parameter (FIG. 10) are alternately transmitted.
Figure 13:
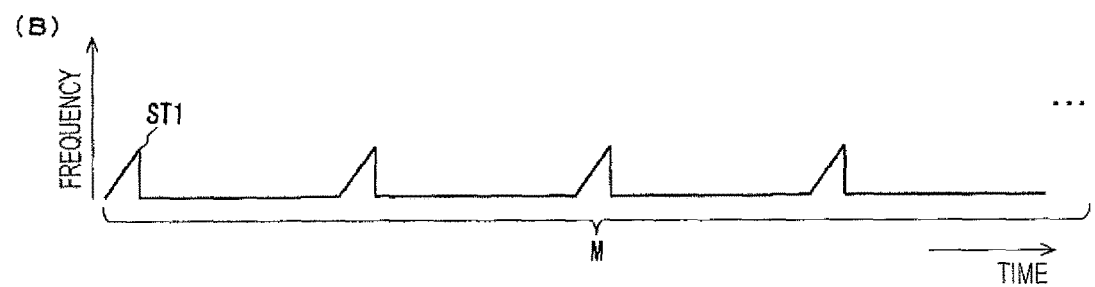
Figure 13:
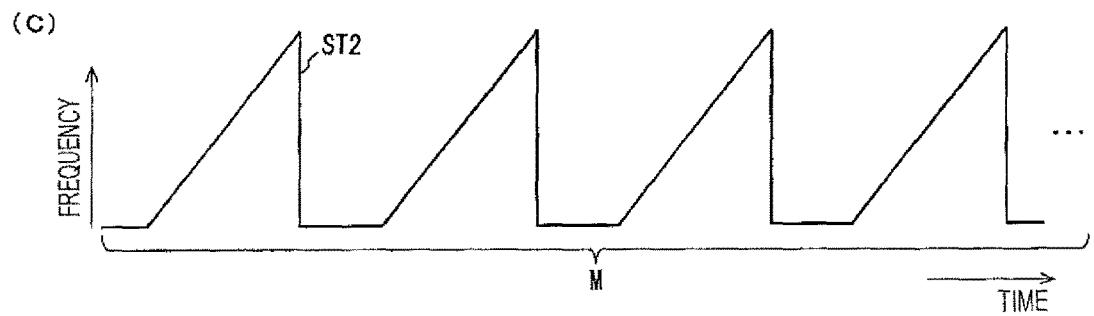

FIG. 13 is an explanatory view of chirps which are used in the present modification, and (A) of FIG. 13 is a view illustrating an example in which chirps ST1 based on the first parameter (the parameter shown in FIG. 9) and chirps ST2 based on the second parameter (the parameter shown in FIG. 10) are alternately transmitted.

Figure 14:
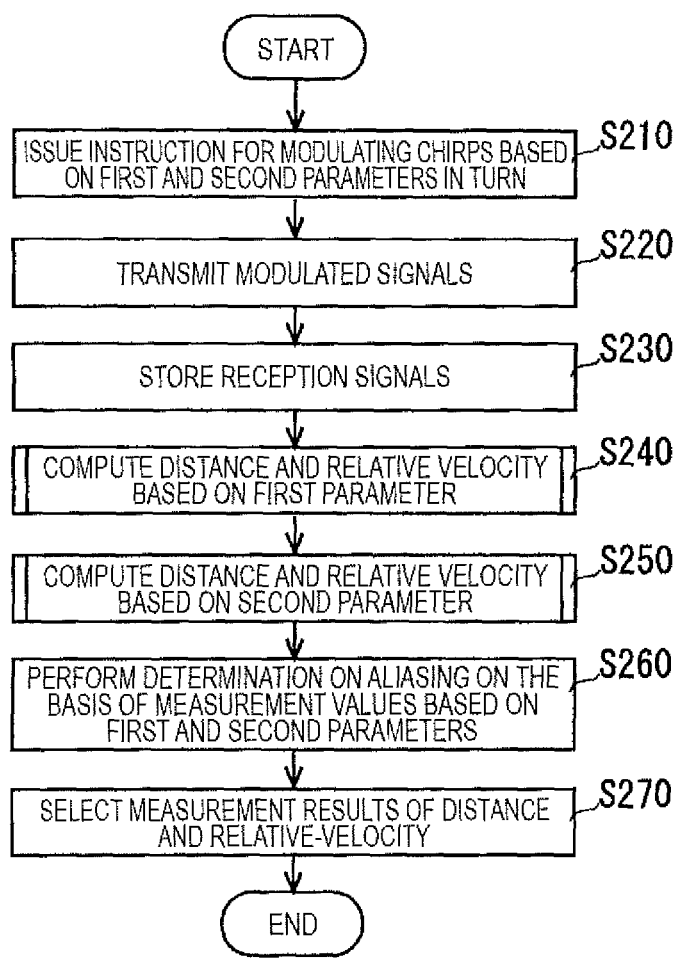
FIG. 14 is an explanatory view of signal processing of a modification.

FIG. 14 is an explanatory view of signal processing of the present modification. In a case where the driving source of the vehicle is operating, for example, if the driving source is an internal combustion engine, in a case where an ignition switch is in an ON state, or if the driving source is a hybrid system or an EV (electric vehicle) system, in a case where the power of the system is in an ON state, the processor 6 repeats the following process flow.

In STEP S210, the processor 6 instructs the signal generating unit 9 to modulate the chirps based on the first parameter and the second parameter preset according to the requirement specifications of the radar device 1, one by one, in turn. Subsequently, in STEP S220, the processor 6 instructs transmission of the transmission signals ST modified in STEP S210.

Thereafter, if the reflected waves of the transmission signals ST from a target are received, and are converted into reception signals SR by A/D conversion of the A/D converters 5 (ch1 to ch4), in STEP S230, the processor 6 acquires the reception signals from the receiving units, and stores the reception signals in the memory. As described above, the chirps ST1 and the chirps ST2 of the transmission signals ST based on the first parameter and the second parameter are alternately transmitted. Therefore, in the reception signals SR, chirps based on the parameters alternately appear. In STEP S240, the processor 6 extracts the first chirps ST1 based on the first parameter from the reception signals SR ((B) of FIG. 13), and performs a two-dimensional FFT process on them, thereby obtaining a first distance and a first relative velocity. Subsequently, in STEP S250, the processor 6 extracts the second chirps ST2 based on the second parameter from the reception signals SR ((C) of FIG. 13), and performs a two-dimensional FFT process on them, thereby obtaining a second distance and a second relative velocity.

Subsequently, in STEP S260, the processor 6 performs determination on aliasing by comparing the distance and the relative velocity based on the first parameter with the distance and the relative velocity based on the second parameter.

Subsequently, in STEP S270, the processor 6 selects a distance and a relative velocity having the highest accuracy (the highest resolution) from distances and relative velocities in which aliasing has not occurred, and outputs them.

As described above, even in a case of transmitting chirps based on the individual parameters, one by one, in turn, it is possible to obtain measurement results having as high accuracy as possible by performing measurement on the basis of each of the parameters and performing determination on aliasing.

Although the preferred embodiment of the present invention has been described above, the radar device according to the present invention is not limited thereto, and can include every combination of the embodiments.

What is claimed is:

1. A radar device comprising:
 a transmitter configured to transmit, at least, a first transmission signal generated on the basis of a first parameter for computing a relative velocity or a distance in a first detection range, and a second transmission signal generated on the basis of a second parameter for computing a relative velocity or a distance in a second detection range narrower than the first detection range;
 a receiver configured to receive the reflected waves of the first transmission signal from a target, as first reception signals, and receive the reflected waves of the second transmission signal from the target, as second reception signals; and
 at least one hardware processor configured to
  compute a first distance in the first detection range on the basis of the first reception signals,
  compute a second distance in the second detection range on the basis of the second reception signals, compare the first distance and the second distance, if the first distance and the second distance overlap each other in a predetermined range, select the second distance as a measurement result of the distance of the target, and if the first distance and the second distance do not overlap each other in the predetermined range, select the first distance as the measurement result.

2. The radar device according to claim 1, wherein the at least one hardware processor is further configured to compute a first relative velocity in the first detection range on the basis of the first reception signals, compute a second relative velocity in the second detection range on the basis of the second reception signals, compare the first relative velocity and the second relative velocity, if the first relative velocity and the second relative velocity overlap each other in a predetermined range, select the second relative velocity as a measurement result of the relative velocity of the target, and if the first relative velocity and the second relative velocity do not overlap each other in the predetermined range, select the first relative velocity as the measurement result.

3. The radar device according to claim 1, wherein the transmitter transmits a plurality of second transmission signals generated on the basis of a plurality of second parameters for computing relative velocities or distances in a plurality of different detection ranges, wherein the receiver receives the reflected waves of the plurality of second transmission signals from the target, as a plurality of second reception signals, and wherein the at least one hardware processor is further configured to compute a plurality of relative velocities or a plurality of second distances on the basis of the plurality of second reception signals, and select any one of the first relative velocity and the plurality of second relative velocities, or any one of the first distance and the plurality of second distances, as the measurement result of the relative velocity or distance of the target.

4. A signal processing device for a radar device, configured to:

transmit, at least, a first transmission signal generated on the basis of a first parameter for computing a relative velocity or a distance in a first detection range, and a second transmission signal generated on the basis of a second parameter for computing a relative velocity or distance in a second detection range narrower than the first detection range, and receive the reflected waves of the first transmission signal from a target, and the reflected waves of the second transmission signal from the target, as first reception signals and second reception signals, respectively;

compute a first distance in the first detection range on the basis of the first reception signals;

compute a second distance in the second detection range on the basis of the second reception signals;

compare the first distance and the second distance;

if the first distance and the second distance overlap each other in a predetermined range, select the second distance as a measurement result of the distance of the target; and if the first distance and the second distance do not overlap each other in the predetermined range, select the first distance as the measurement result.

5. A signal processing method for a radar device, comprising:

transmitting, at least, a first transmission signal generated on the basis of a first parameter for computing a relative velocity or a distance in a first detection range, and a second transmission signal generated on the basis of a second parameter for computing a relative velocity or distance in a second detection range narrower than the first detection range, and receiving the reflected waves of the first transmission signal from a target, and the reflected waves of the second transmission signal from the target, as first reception signals and second reception signals, respectively;

computing a first distance in the first detection range on the basis of the first reception signals;

computing a second distance in the second detection range on the basis of the second reception signals;

comparing the first distance and the second distance;

if the first distance and the second distance overlap each other in a predetermined range, selecting the second distance as a measurement result of the distance of the target; and if the first distance and the second distance do not overlap each other in the predetermined range, selecting the first distance as the measurement result.

\* \* \* \* \*